(12) United States Patent
Ferniani

(10) Patent No.: US 12,097,677 B2
(45) Date of Patent: Sep. 24, 2024

(54) MOLDED FOOTWEAR UPPER WITH KNIT TEXTURE

(71) Applicant: Crocs, Inc., Broomfield, CO (US)

(72) Inventor: Stefano Ferniani, Padua (IT)

(73) Assignee: Crocs, Inc., Broomfield, CO (US)

( * ) Notice: Subject to any disclaimer, the term of this patent is extended or adjusted under 35 U.S.C. 154(b) by 237 days.

(21) Appl. No.: 17/013,132

(22) Filed: Sep. 4, 2020

(65) Prior Publication Data
US 2021/0070002 A1 Mar. 11, 2021

Related U.S. Application Data

(60) Provisional application No. 62/897,066, filed on Sep. 6, 2019.

(51) Int. Cl.
*B29D 35/12* (2010.01)
*A43B 17/00* (2006.01)
(Continued)

(52) U.S. Cl.
CPC .......... *B29D 35/126* (2013.01); *A43B 17/003* (2013.01); *A43B 23/0215* (2013.01); *B29C 33/0033* (2013.01); *B29C 45/00* (2013.01); *B29D 35/146* (2013.01); *B29K 2023/083* (2013.01); *B29K 2075/00* (2013.01)

(58) Field of Classification Search
CPC ..... A43B 17/003; A43B 1/04; A43B 23/0215; A43B 9/12; B29D 35/126; B29D 35/146; B29K 2023/083; B29K 2075/00; B29C 45/00; B29C 33/0033
See application file for complete search history.

(56) References Cited

U.S. PATENT DOCUMENTS

| 4,279,049 A | * | 7/1981 | Coiquaud | A43B 3/102 36/11.5 |
| 4,605,455 A | | 8/1986 | Lai | |

(Continued)

OTHER PUBLICATIONS

International Search Report and Written Opinion dated Nov. 23, 2020 received in related PCT/US2020/049486 filed Sep. 4, 2020 (8 pages).

(Continued)

*Primary Examiner* — Philip C Tucker
*Assistant Examiner* — Jimmy R Smith, Jr.
(74) *Attorney, Agent, or Firm* — Wilmer Cutler Pickering Hale and Dorr LLP

(57) ABSTRACT

A method of manufacturing a shoe component may include injecting a material into a mold cavity to create a thin sheet of molded material formed as a single piece with molded holes extending through the molded material and formed as part of the injection molding process. The thin sheet of molded material may be in a shape that can be secured together to form a shoe upper including a vamp, a medial portion, and a lateral portion. The method may include removing, from the mold cavity, the sheet of molded material, folding the sheet of molded material, optionally cementing a first portion of the sheet of molded material to a second portion of the sheet of molded material, and cementing a third portion of the sheet of molded material to a sole to form a shoe. The completed shoe may also include an insole, a tongue, and laces.

21 Claims, 22 Drawing Sheets

(51) Int. Cl.
*A43B 23/02* (2006.01)
*B29C 33/00* (2006.01)
*B29C 45/00* (2006.01)
*B29D 35/14* (2010.01)
*B29K 23/00* (2006.01)
*B29K 75/00* (2006.01)

(56) References Cited

U.S. PATENT DOCUMENTS

| | | |
|---|---|---|
| 9,282,787 B2 | 3/2016 | Ferniani et al. |
| 10,028,549 B2 | 7/2018 | Ferniani et al. |
| 10,065,384 B2 | 9/2018 | Ferniani et al. |
| 2011/0078922 A1* | 4/2011 | Cavaliere ............... B29D 35/10 36/77 R |
| 2012/0198730 A1* | 8/2012 | Burch ................ A43B 23/0245 264/138 |
| 2013/0139329 A1* | 6/2013 | Ferniani ................. A43B 7/085 12/128 R |
| 2015/0077910 A1* | 3/2015 | Xie ..................... B23K 26/361 361/679.01 |
| 2018/0242690 A1 | 8/2018 | Webster |

OTHER PUBLICATIONS

Office Action dated Sep. 1, 2023 received in related Chinese application 2020800681995 filed Sep. 4, 2020 (pp. 1-8 original, pp. 9-16 English machine translation).
Second Office Action dated Apr. 17, 2024, issued in related Chinese Application No. 2020800681995 (pp. 1-9 original, pp. 10-19 English machine translation).

* cited by examiner

MOLDED FOOTWEAR UPPER WITH KNIT TEXTURE

CROSS-REFERENCE TO RELATED APPLICATIONS

This application claims the benefit of U.S. Provisional Patent Application Ser. No. 62/897,066, filed on Sep. 6, 2019, which is incorporated by reference herein in its entirety for all purposes.

BACKGROUND

Footwear is a part of everyday life all over the world. In addition to the obvious benefits of protecting feet, many wearers choose shoes based on aesthetics or comfort. Many different styles, materials, and designs are used to appeal to different users. Thus, there will always be a need for improved footwear designs and methods of manufacturing footwear with improved designs.

SUMMARY

The following summary presents a simplified summary of certain features. The summary is not an extensive overview and is not intended to identify key or critical elements.

One or more embodiments may include a method comprising: injecting a material into a mold cavity to create a sheet of molded material with a thickness less than 5 millimeters and molded holes extending between an inner surface of the molded material and an outer surface of the molded material, wherein the sheet of molded material is in a shape that can be secured together to form a shoe upper comprising a vamp, a medial portion, and a lateral portion; removing, from the mold cavity, the sheet of molded material; folding the sheet of molded material; and cementing a portion of the sheet of molded material to a sole to form a shoe.

In one or more embodiments, the material may be a thermoplastic polyurethane (TPU) material. In one or more embodiments, the material may be an ethylene vinyl acetate (EVA) material.

In one or more embodiments, the material may have a melt-temperature range between 205 degrees Celsius and 225 degrees Celsius. In one or more embodiments, the material may have a short-term maximum temperature of 255 degrees Celsius.

In one or more embodiments, the method may include scanning a textile with a high-precision scanner; and etching, using a laser, a texture of the textile to a mold for the mold cavity. In one or more embodiments, the texture of the textile may be a negative of a texture of the sheet of molded material.

In one or more embodiments, the sheet of molded material may have a thickness between 5 millimeters and 0.04 millimeters. In one or more embodiments, a first point of the sheet of molded material may have a first thickness, and a second point of the sheet of molded material may have a second thickness different from the first thickness. In one or more embodiments, an average thickness of the sheet of molded material may be less than 1.5 millimeters.

In one or more embodiments, the sheet of molded material may include a plurality of different areas, each with a different texture.

In one or more embodiments, the method may include inserting an insole into the shoe. In one or more embodiments, the insole may be a foam insole. In one or more embodiments, inserting the insole into the shoe may include inserting the insole into the shoe such that after the insole is inserted into the shoe, at least a portion of the molded material is between at least a portion of the insole and at least a portion of the sole of the shoe. In one or more embodiments, inserting the insole into the shoe may include inserting the insole into the shoe such that after the insole is inserted into the shoe, at least a portion of the insole is in direct contact with at least a portion of the sole of the shoe.

In one or more embodiments, the sheet of molded material may be used to form an entire upper portion of the shoe.

In one or more embodiments, the shoe upper may include a heel portion and a toe portion.

In one or more embodiments, the method may include attaching a tongue to the molded material by sewing the tongue to the molded material. In one or more embodiments, the tongue may be made at least partially of a knitted material.

In one or more embodiments, the method may include cementing a second portion of the sheet of molded material to a third portion of the sheet of molded material.

One or more embodiments may include a shoe component comprising: a sheet of material formed as a single piece by an injection molding process, the sheet of material having a thickness less than 5 millimeters and holes extending between an inner surface of the material and an outer surface of the material, the holes having been formed in the injection molding process, wherein the sheet of material is in a shape that can be secured together to form a shoe upper comprising a vamp, a medial portion, and a lateral portion; the sheet of material configured to be folded, and to have a portion of the sheet of material cemented to a sole to form a shoe.

In one or more embodiments, the sheet of material of the shoe component may be configured to have a second portion of the sheet of material cemented to a third portion of the sheet of material.

DESCRIPTION OF DRAWINGS

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

DETAILED DESCRIPTION

In the following description of various illustrative embodiments, reference is made to the accompanying drawings, which form a part hereof, and in which is shown, by way of illustration, various embodiments in which aspects of the disclosure may be practiced. Other embodiments may be utilized, and structural and functional modifications may be made, without departing from the scope of the present disclosure.

One type of footwear is a shoe with a textile knitted upper. Shoes with textile knitted uppers are comfortable, in part because the knitted uppers stretch and are pliable. Shoes with textile knitted uppers also reduce the amount of material waste and labor compared to traditional textile uppers. Traditional textile uppers are expensive, however.

Footwear may be constructed to include a shoe upper made using an injection molding process. The shoe upper may look like a textile knitted shoe upper, but may be injection molded. This footwear may provide a similar comfort (e.g., pliability and stretch) as footwear made from a textile knitted upper, but may have a lower cost, may have lower labor requirements, and may produce less material waste. The injection molded upper might not be molded in a final three-dimensional shape, but instead may be molded in a relatively flat shape.

A shoe upper may be molded primarily flat in a thermoplastic elastic material, then folded to a final shape, cemented in a heel portion, and cemented to a sole (e.g., a Croslite sole). By molding the shoe upper primarily flat, the shoe upper thickness may be reduced from around 2.5 millimeters to around 1.5 millimeters, which may result in a more pliable and stretchable final product. The shoe upper may include a number of small holes, which increases breathability.

Figure 1:
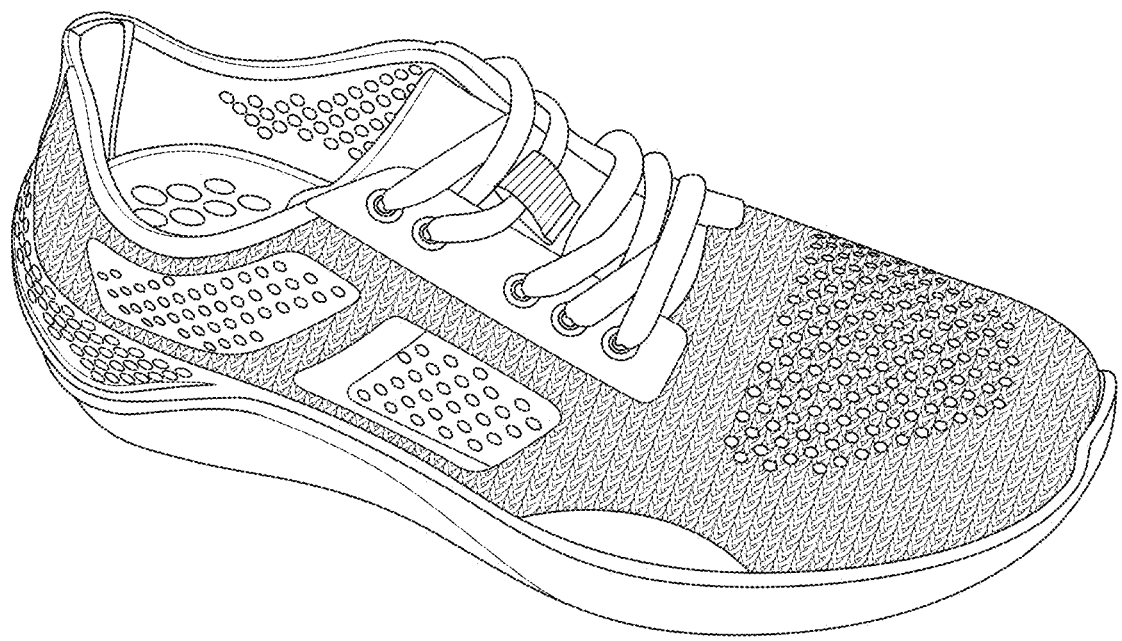
FIG. 1 illustrates a shoe with a molded footwear upper with knit texture, according to one or more embodiments described in this disclosure.

FIG. 1 depicts an illustrative shoe made from a molded upper with a knit texture. The shoe may include a shoe component with a sheet of material formed as a single piece by an injection molding process, the sheet of material having a thickness less than 5 millimeters and holes extending between an inner surface of the material and an outer surface of the material, the holes having been formed in the injection molding process, wherein the sheet of material is in a shape that can be secured together to form a shoe upper including a vamp, a medial portion, and a lateral portion. The sheet of material may be configured to be folded, and to have a portion of the sheet of material cemented to a sole to form a shoe. The sheet of material may, in one or more embodiments, be configured to have a second portion of the sheet of material cemented to a third portion of the sheet of material.

Figure 2:
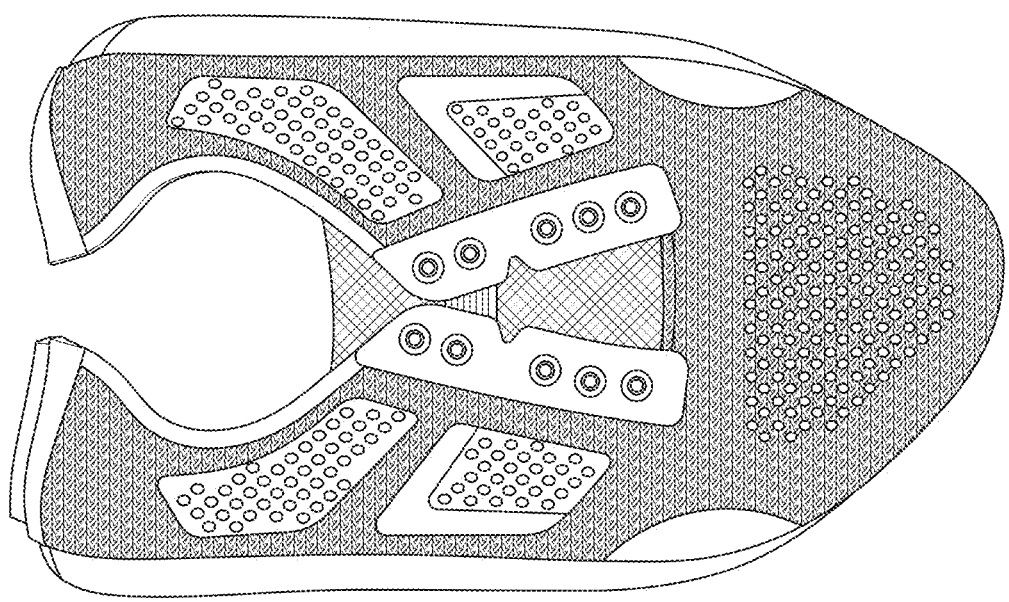
FIG. 2 illustrates a molded footwear upper with knit texture, according to one or more embodiments described in this disclosure.

FIG. 2 depicts an illustrative shoe upper after the upper has been molded and removed from a mold cavity. The shoe upper may be molded from one or more materials. For example, the material may be a thermoplastic polyurethane (TPU) material, an ethylene vinyl acetate (EVA) material, or another material. The material may have a melt-temperature range between 205 degrees Celsius and 225 degrees Celsius. The material may have a short-term maximum temperature of 255 degrees Celsius.

The shoe upper may be molded using a molding process. For example, a process may include injecting a material into a mold cavity to create a sheet of molded material with a thickness less than 5 millimeters and molded holes extending between an inner surface of the molded material and an outer surface of the molded material. The sheet of molded material may be removed from the mold cavity.

The sheet of molded material may include a vamp, a medial portion, and a lateral portion. The sheet of molded material may be used to form an entire upper portion of a shoe (e.g., a shoe upper). The shoe upper may include a heel portion and a toe portion.

After being removed from the mold cavity, the sheet of molded material may be attached to a tongue (e.g., because the sheet of molded material may be molded separately from the tongue). The tongue may be attached to the sheet of molded material using one or more attachment processes (e.g., sewn, stapled, glued, cemented, melted, welded).

Figure 3A:
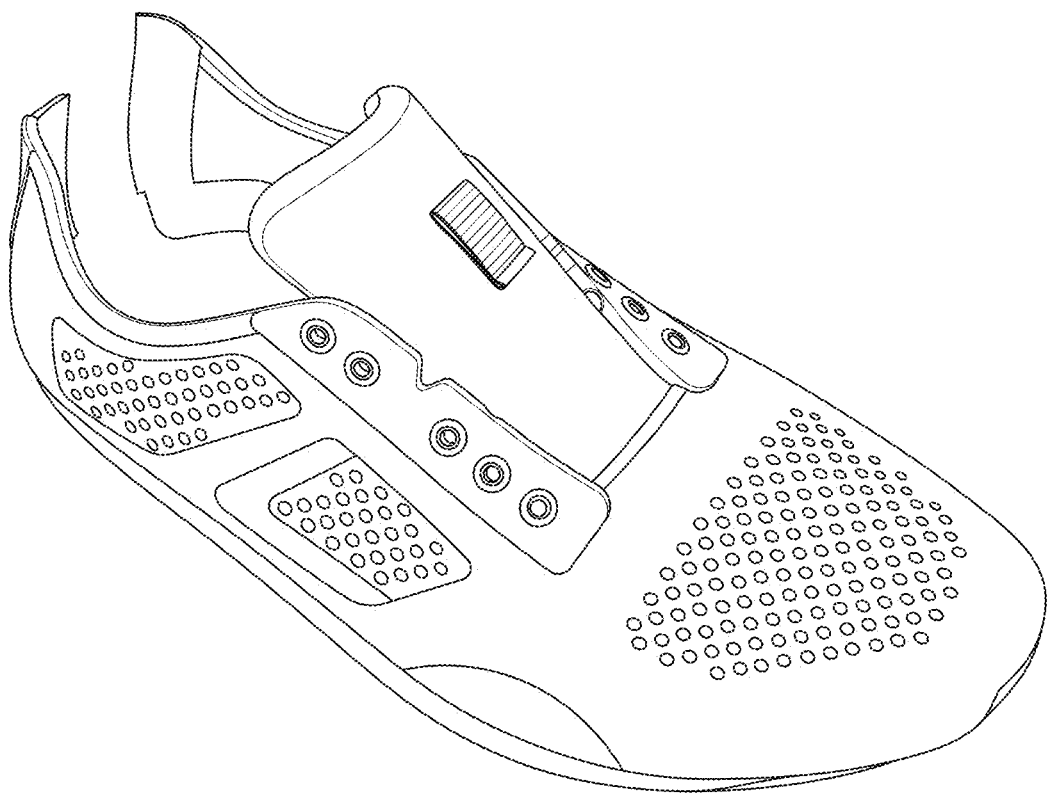
FIG. 3A illustrates a molded footwear upper with knit texture, according to one or more embodiments described in this disclosure.

FIG. 3A depicts an illustrative view of a sheet of molded material after it has been folded. The tongue is visible in FIG. 3A as well. The sheet of molded material (e.g., as depicted in FIG. 2) may be folded to be in a shape similar to the shape depicted in FIG. 3A, such that the sheet of molded material is in a shape of a shoe upper.

Figure 3B:
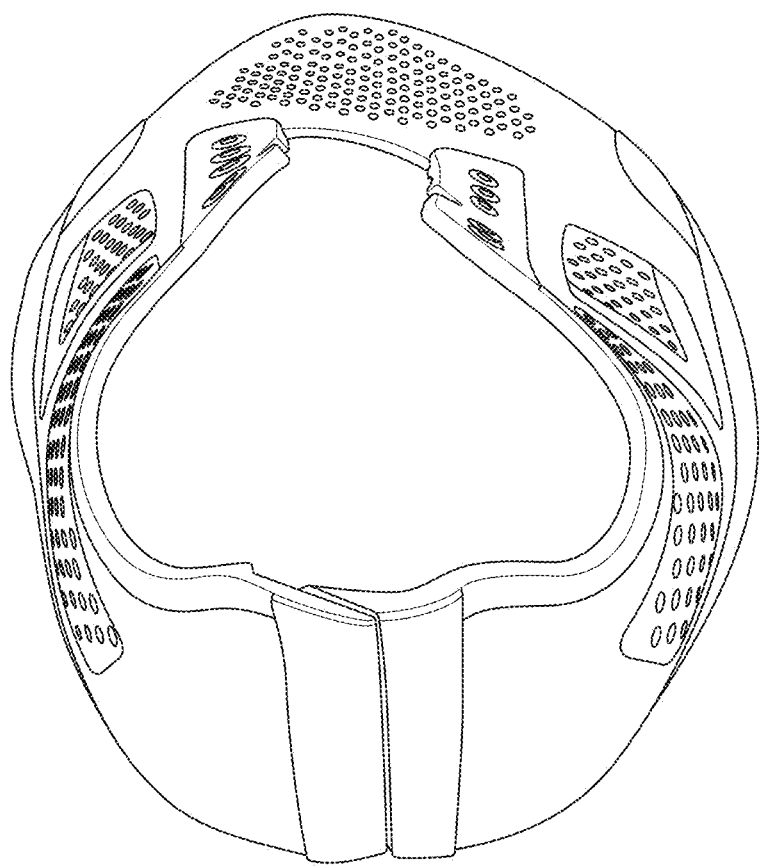
FIG. 3B illustrates a rear view of a molded footwear upper with knit texture, according to one or more embodiments described in this disclosure.

FIG. 3B depicts an illustrative view of a rear portion (e.g., heel portion) of a sheet of molded material, which may be used as a shoe upper. In one or more embodiments, a first portion of the sheet of molded material may be cemented to a second portion of the sheet of molded material (e.g., near a rear or heel portion of the shoe upper). As depicted in FIG. 3A, the first portion and the second portion may line up with each other near the rear portion of the shoe upper. In one or more embodiments, it might not be necessary to cement a first portion of the sheet of molded material to a second portion of the sheet of molded material.

In one or more embodiments, a shoe upper may be injected into a mold without being in an open configuration. In other words, the shoe upper may be injected into a mold that is already configured in a final shape. In this embodiment, the shoe upper might not be folded or cemented to itself, since the shoe upper may be molded in a single piece that comes out of the mold substantially in a shape ready to be attached to a sole. If a shoe upper is molded in this shape, a thickness of the shoe upper may be increased, and a stretch of the shoe upper may be reduced.

Figure 4A:
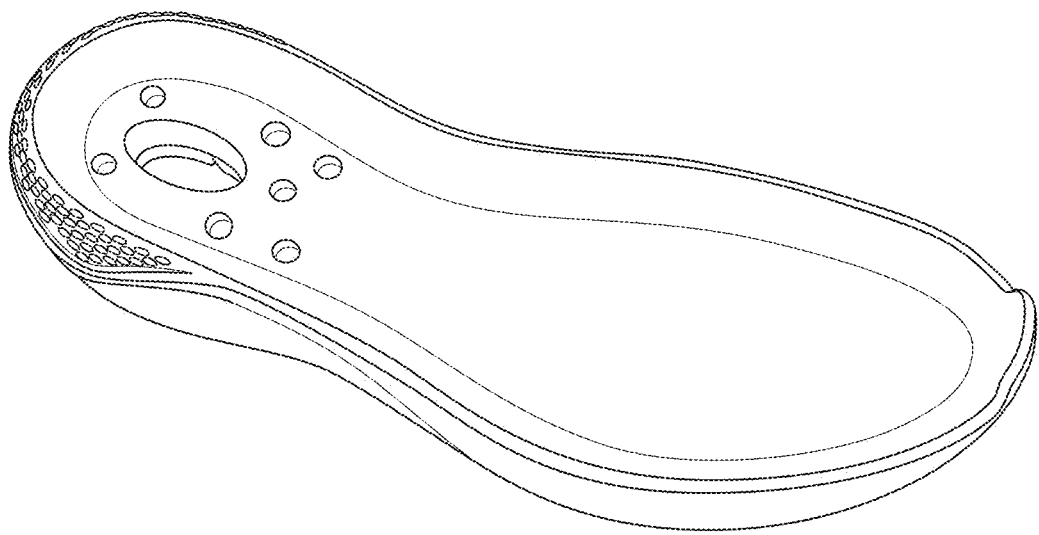
FIG. 4A illustrates a top angle view of a shoe sole according to one or more embodiments described in this disclosure.

FIG. 4A depicts an illustrative top angle view of a shoe sole. The shoe sole may be manufactured independently from a shoe upper. The shoe sole may be configured to be attached to a shoe upper (e.g., a sheet of molded material formed into a shoe upper, as depicted in FIGS. 2-3B). As depicted in FIG. 4A, the shoe sole is not attached to a shoe upper. The shoe sole may be shaped to receive a shoe insole insert.

Figure 4B:
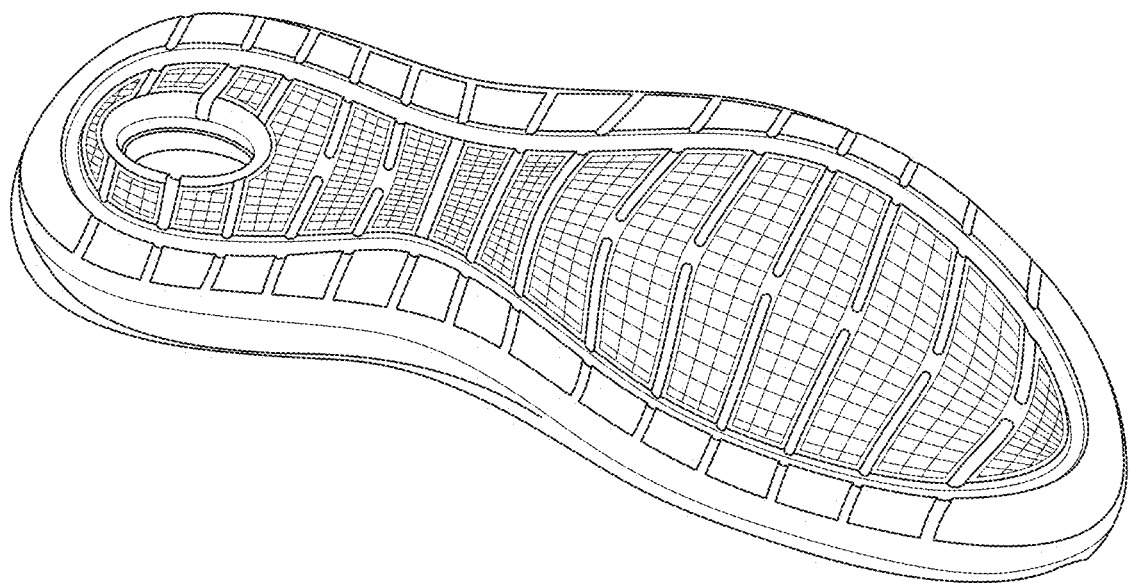
FIG. 4B illustrates a bottom angle view of a shoe sole according to one or more embodiments described in this disclosure.

FIG. 4B depicts an illustrative bottom angle view of a shoe sole. As depicted, the shoe sole is not attached to a shoe upper.

Figure 4C:
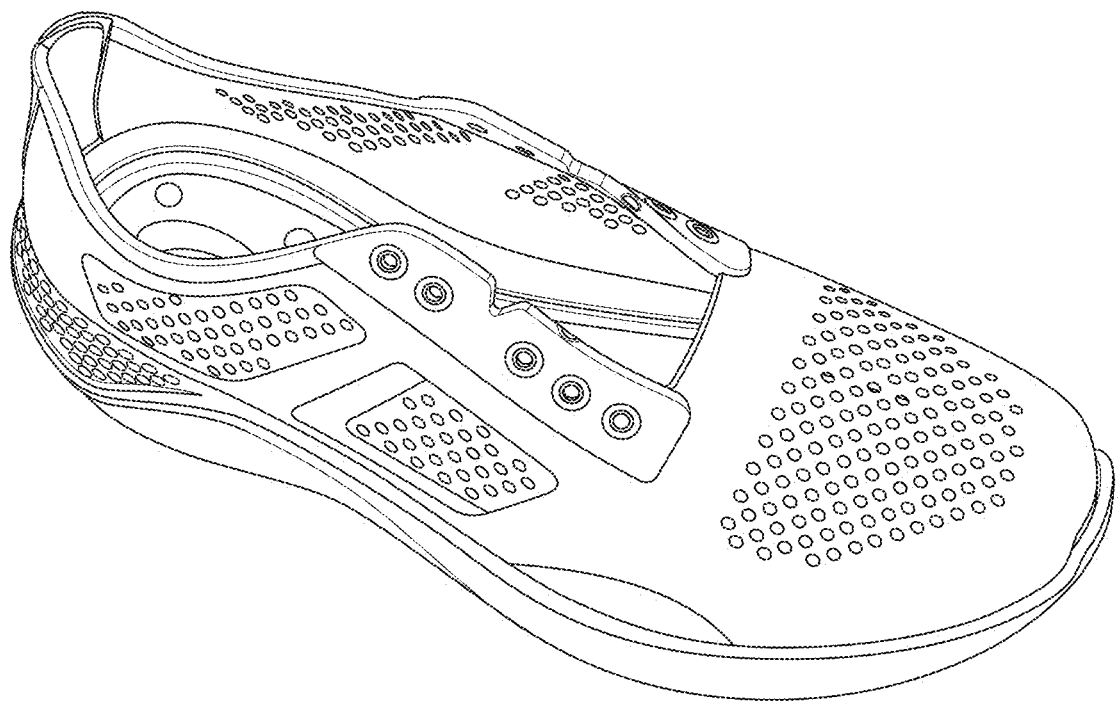
FIG. 4C illustrates a molded footwear upper with knit texture attached to a shoe sole according to one or more embodiments described in this disclosure.

FIG. 4C depicts an illustrative shoe upper attached to a shoe sole. The shoe upper may be a sheet of molded material, which optionally may be secured together, forming a shoe upper comprising a vamp, a medial portion, and a lateral portion, as described in connection with FIGS. 2-3B. Specifically, as described in connection with FIG. 3B, in one or more embodiments, a first portion of the sheet of molded material may be cemented to a second portion of the sheet of molded material. A third portion of the sheet of molded material may be cemented to a sole, and the sheet of molded material cemented to the sole may together form a shoe. In one or more alternative embodiments, the shoe upper might not have a first portion of the sheet of molded material cemented to a second portion of the sheet of molded material; instead, the shoe upper may be formed in a manner such that the shoe upper is a single piece that, after it is folded, is in a desired form for acting as a shoe upper. The shoe upper depicted in FIG. 4C does not have a tongue attached.

Figure 5A:
FIG. 5A illustrates a shoe tongue according to one or more embodiments described in this disclosure.

FIG. 5A depicts an illustrative tongue. As depicted, the tongue is not yet attached to a shoe. The tongue may be made from one or more materials, such as a knitted material, fabric, plastic, metal, wood, cotton, linen, polyester, or a combination of materials. The one or more materials may have one or more textures, such as a knit texture or a weave texture. The tongue may be attached to the molded material by sewing the tongue to the molded material.

Figure 5B:
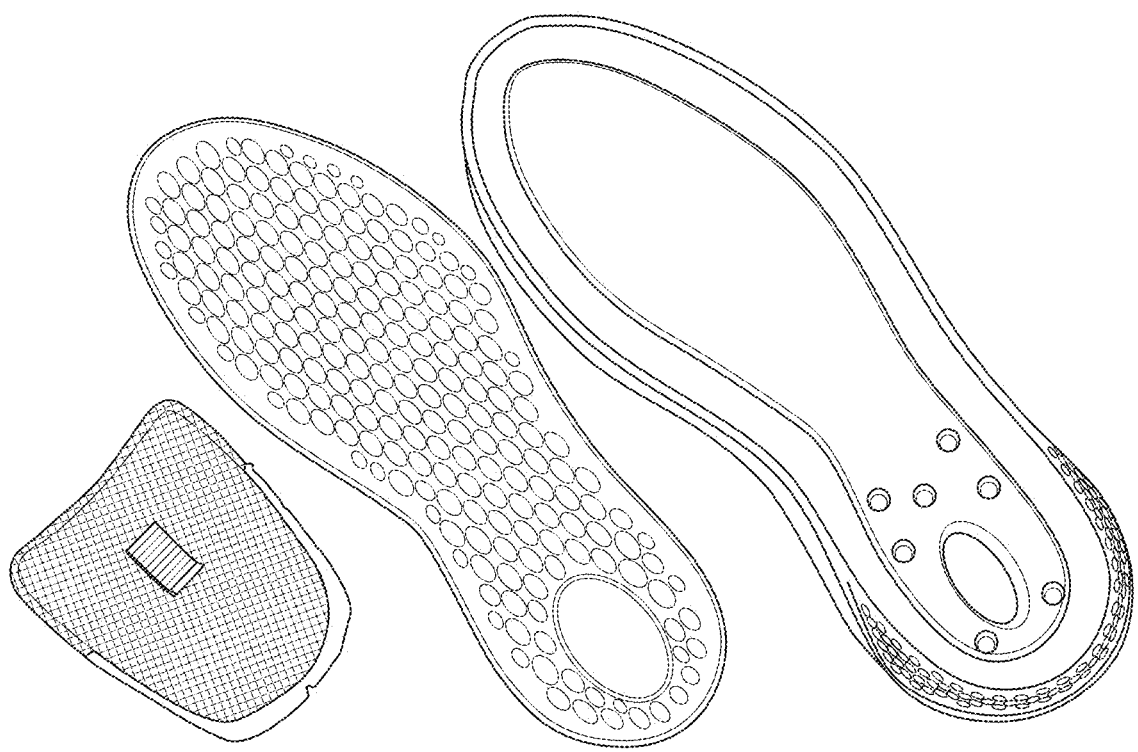
FIG. 5B illustrates a shoe tongue, a shoe insole, and a shoe sole according to one or more embodiments described in this disclosure.

FIG. 5B depicts an illustrative tongue, insole, and sole, each separate from each other and an assembled shoe. An assembled shoe (e.g., as depicted in FIG. 1) may include a tongue, insole, sole, and shoe upper (not depicted).

Figure 6A:
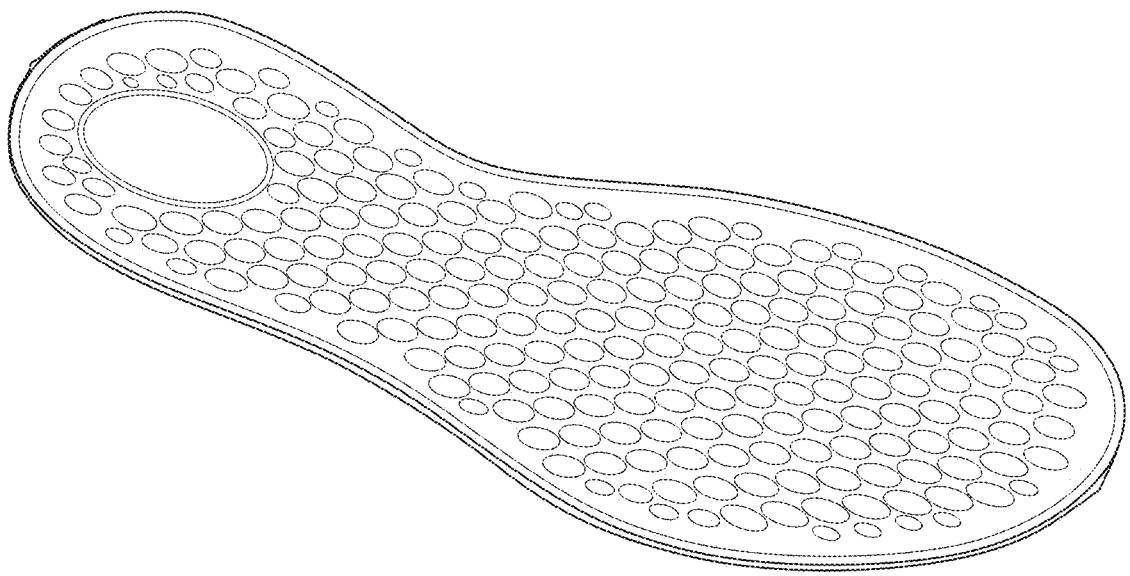
FIG. 6A illustrates a shoe insole according to one or more embodiments described in this disclosure.

FIG. 6A depicts an illustrative shoe insole. After a shoe upper is attached to a shoe sole, a shoe insole may be inserted into the shoe, between the shoe upper and the shoe sole. A shoe insole may be a foam insole.

Figure 6B:
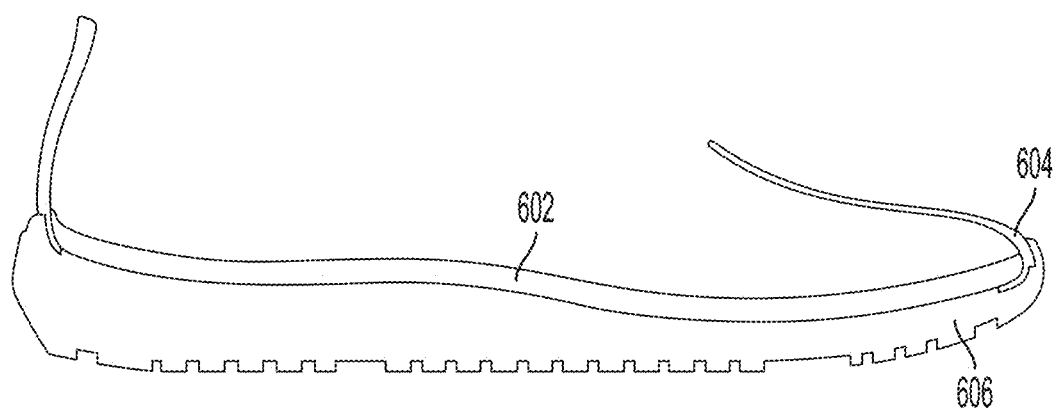
FIG. 6B illustrates a side view drawing of an insole inserted into a shoe with a molded footwear upper attached to a shoe sole according to one or more embodiments described in this disclosure.
Figure 7A:
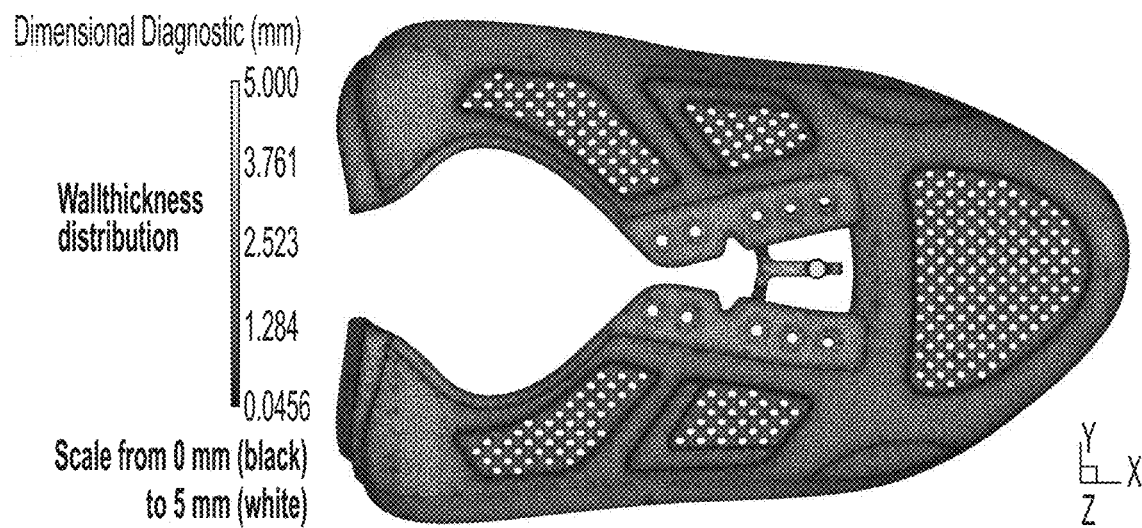
FIG. 7A illustrates a moldflow insight depicting a thickness map of a sheet of molded material according to one or more embodiments described in this disclosure.

FIG. 6B depicts an illustrative rendering of a side view of a shoe with a sole (e.g., sole 606) attached to a shoe upper (e.g., shoe upper 604), and an insole (e.g., insole 602) inserted into the shoe. As depicted, an edge of the shoe upper (e.g., shoe upper 604) may be between the insole (e.g., insole 602) and the sole (e.g., sole 606). In one or more embodiments, the insole (e.g., insole 602) may be inserted into the shoe such that after the insole (e.g., insole 602) is inserted into the shoe, at least a portion of the molded material (e.g., shoe upper 604) is between at least a portion of the insole (e.g., insole 602) and at least a portion of the sole (e.g., sole 606) of the shoe. In one or more embodiments, the insole (e.g., insole 602) may be inserted into the shoe such that after the insole (e.g., insole 602) is inserted into the shoe, at least a portion of the insole (e.g., insole 602) is in direct contact with at least a portion of the sole (e.g., sole 606) of the shoe FIG. 7A depicts an illustrative thickness-based map depicting thicknesses at different portions of a sheet of molded material, which may be formed into a shoe upper. As depicted, a sheet of molded material have a thickness between 5 millimeters and 0.04 millimeters. As depicted, a first point of the sheet of molded material may have a first thickness, a second point of the sheet of molded material may have a second thickness different from the first thickness, a third point of the sheet of molded material may have a third thickness different from the first thickness and the second thickness, and so on. While portions of the sheet of molded material may be thicker than other portions, an overall average thickness of the sheet of molded material may be relatively thin (e.g., an average thickness of the sheet of molded material is less than 1.5 millimeters).

Figure 7B:
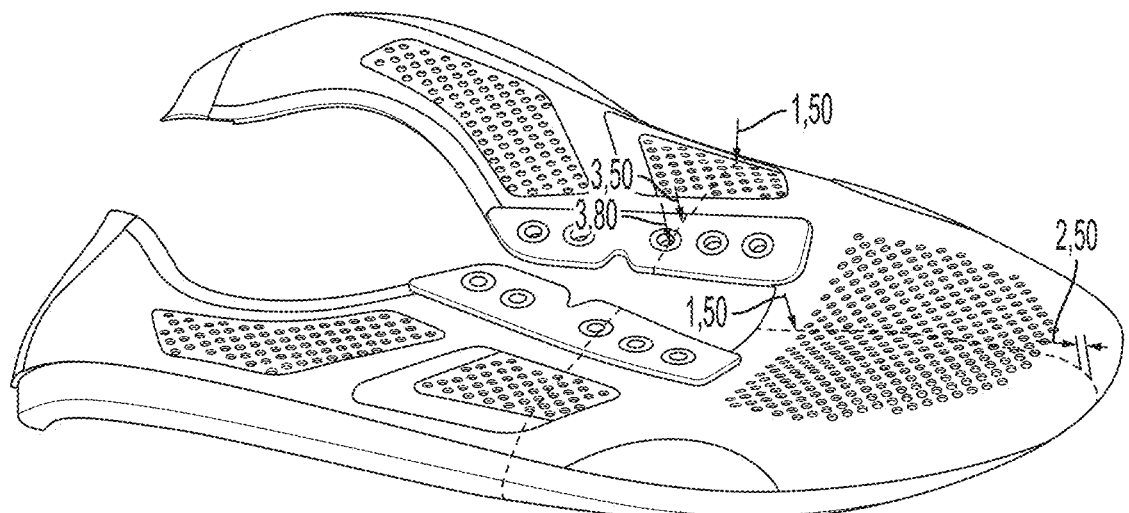
FIG. 7B illustrates a top angle view of a rendering of a molded footwear upper with knit texture according to one or more embodiments described in this disclosure.

FIG. 7B depicts an illustrative top angle view of a rendering of a sheet of molded material. The rendering may represent a sheet of molded material as the sheet of molded material may be formed in a mold. As depicted, the sheet of molded material might not be perfectly flat, but instead may include one or more curved portions or shaped portions. The sheet of molded material may include one or more through holes, which are formed as part of the molding process. The sheet of molded material may include one or more textures that are formed as part of the molding process, after the molding process, or a combination.

The sheet of molded material has different thicknesses at different points. For example, as depicted, a first point of the sheet of molded material has a thickness of 1.50 millimeters. A second point of the sheet of molded material also has a thickness of 1.50 millimeters. A third point of the sheet of molded material has a thickness of 3.50 millimeters. A fourth point of the sheet of molded material has a thickness of 3.80 millimeters. A fifth point of the sheet of molded material has a thickness of 2.50 millimeters.

Figure 7C:
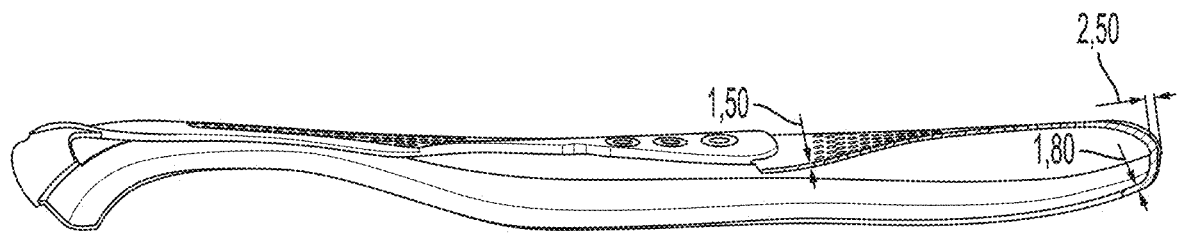
FIG. 7C illustrates a side view of a rendering of a molded footwear upper with knit texture according to one or more embodiments described in this disclosure.

FIG. 7C depicts an illustrative side view of a rendering of a sheet of molded material. The sheet of molded material has different thicknesses at different points. For example, as depicted, a first point of the sheet of molded material has a thickness of 1.50 millimeters. A second point of the sheet of molded material has a thickness of 1.80 millimeters. A third point of the sheet of molded material has a thickness of 2.50 millimeters.

Figure 7D:
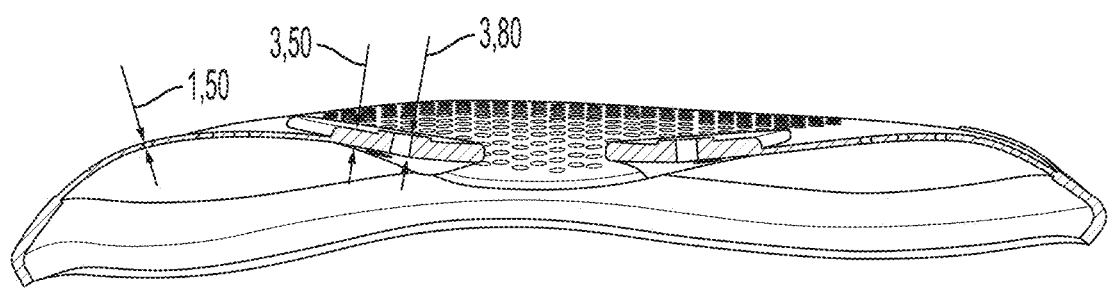
FIG. 7D illustrates a rear view of a rendering of a molded footwear upper with knit texture according to one or more embodiments described in this disclosure.

FIG. 7D depicts an illustrative rear view of a rendering of a sheet of molded material. The sheet of molded material has different thicknesses at different points. For example, as depicted, a first point of the sheet of molded material has a thickness of 1.50 millimeters. A second point of the sheet of molded material has a thickness of 3.50 millimeters. A third point of the sheet of molded material has a thickness of 3.80 millimeters.

Figure 7E:
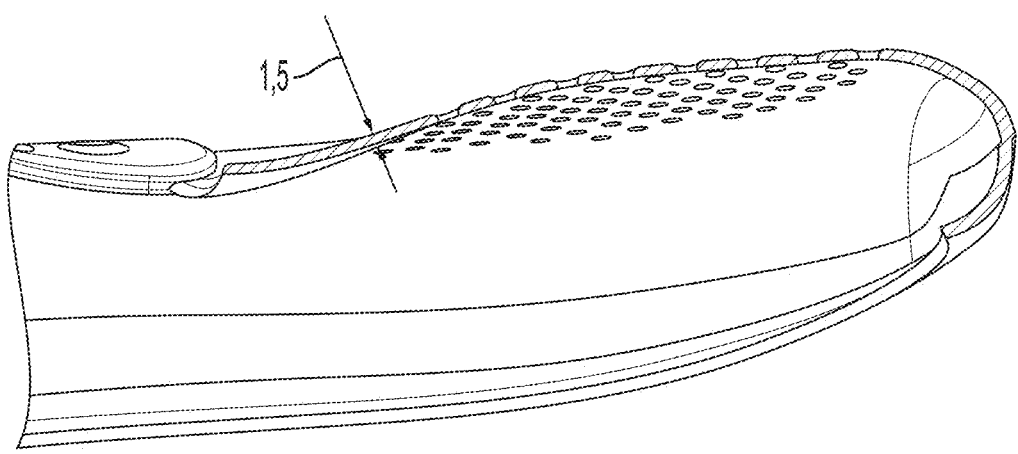
FIG. 7E illustrates an interior cutaway angle view of a rendering of a molded footwear upper with knit texture according to one or more embodiments described in this disclosure.

FIG. 7E depicts an illustrative interior cutaway angle view of a rendering of a sheet of molded material. As depicted, a point of the sheet of molded material has a thickness of 1.5 millimeters. As depicted, the sheet of molded material includes a plurality of through holes that extend from a first surface of the sheet of molded material through to a second surface of the sheet of molded material.

Figure 8:
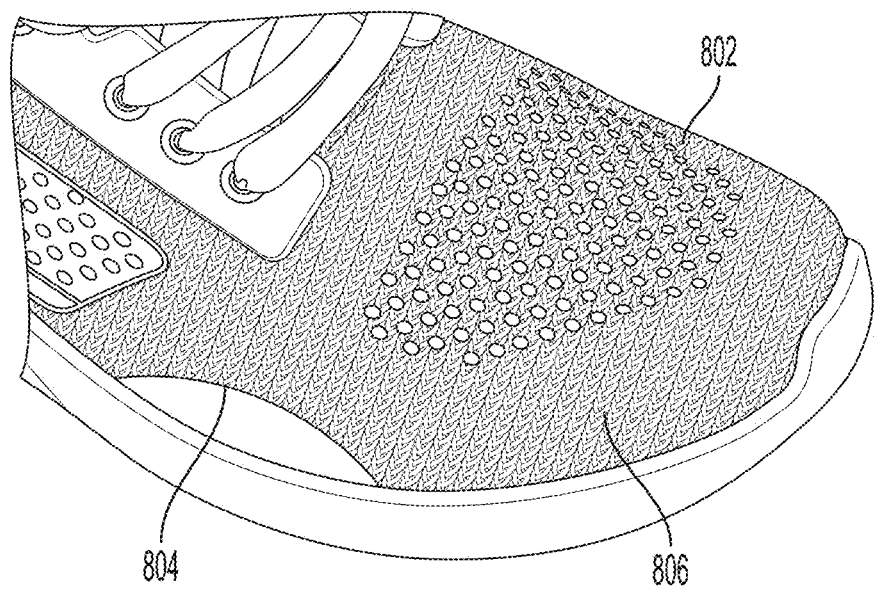
FIG. 8 illustrates a close-up view of a toe portion of a shoe with a molded footwear upper with knit texture, where the molded footwear upper is attached to a sole, has a tongue attached, and has laces installed, according to one or more embodiments described in this disclosure.

FIG. 8 depicts an illustrative front portion of an assembled shoe. In one or more embodiments, the sheet of molded material may comprise a plurality of different areas, each with a different texture. One or more textures may be formed as part of a molding process, added to the sheet of molded material after a molding process (e.g., via a cutting process, such as a laser cutting process), or a combination.

For example, as depicted in FIG. 8, a front portion of the shoe, which may be part of a shoe upper formed from a sheet of molded material, illustrates multiple textures that are part of the shoe. Specifically, texture 802 may include one or more through-holes that extend from a first surface of a shoe upper to a second surface of the shoe upper. As another example, texture 804 may be formed on a first surface of a shoe upper, but not extend through to a second surface of the shoe upper. As another example, texture 806 may be formed on a first surface of a shoe upper. Each texture (e.g., texture 802, texture 804, texture 806) may be different from one or more other textures of the shoe or the shoe upper.

Figure 9A:
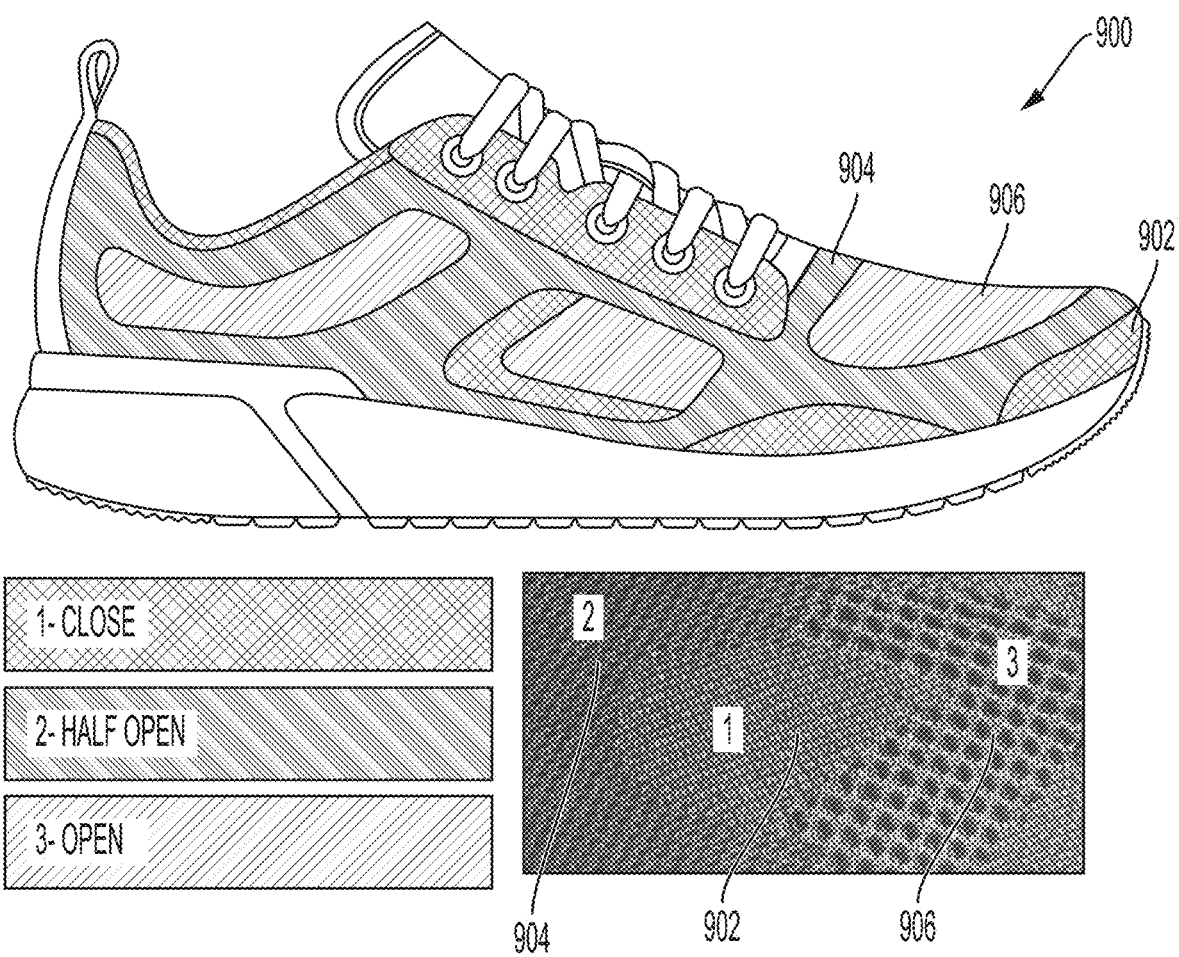
FIG. 9A illustrates a side view of footwear made with a molded footwear upper with knit texture, with a number of different texture panels, and an illustrative photograph of a textured portion of footwear, according to one or more embodiments described in this disclosure.

FIG. 9A depicts an illustrative example of an assembled shoe (e.g., assembled shoe 900) with a shoe upper formed from a sheet of molded material. Assembled shoe 900 may include multiple different textures. For example, assembled shoe 900 may include a first texture 902 (e.g., a close texture), a second texture 904 (e.g., a half open texture), and/or a third texture 906 (e.g., an open texture).

Figure 9B:
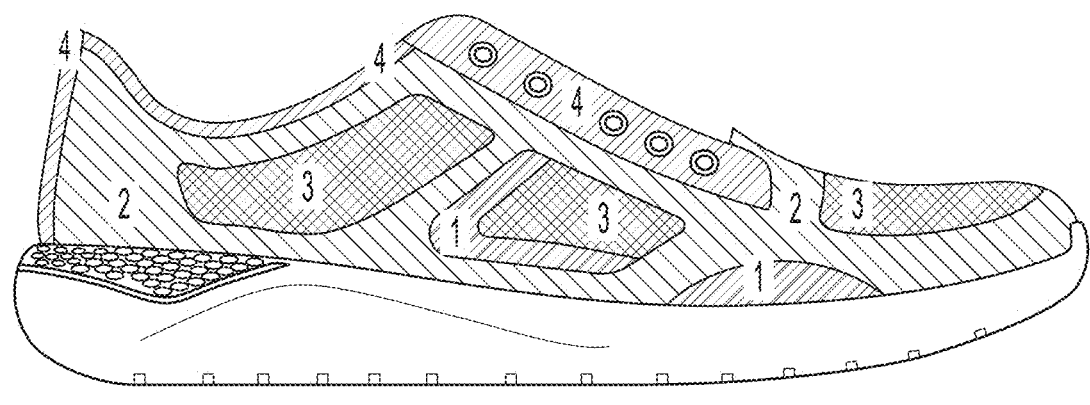
FIG. 9B illustrates a side view of footwear made with a molded footwear upper with knit texture, with a number of different texture panels, according to one or more embodiments described in this disclosure.
Figure 9B:
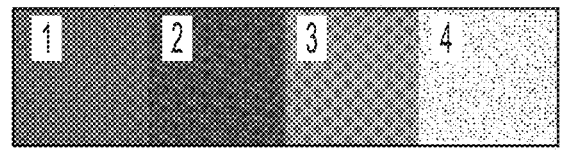

FIG. 9B depicts an illustrative depiction of a shoe with a shoe upper that has a plurality of different panel areas, where each panel area has a different texture. As depicted in FIG. 9B, each texture may be closed, but in another embodiment, the shoe upper may include open, partially open, or closed textures, or a combination.

Figure 10A:
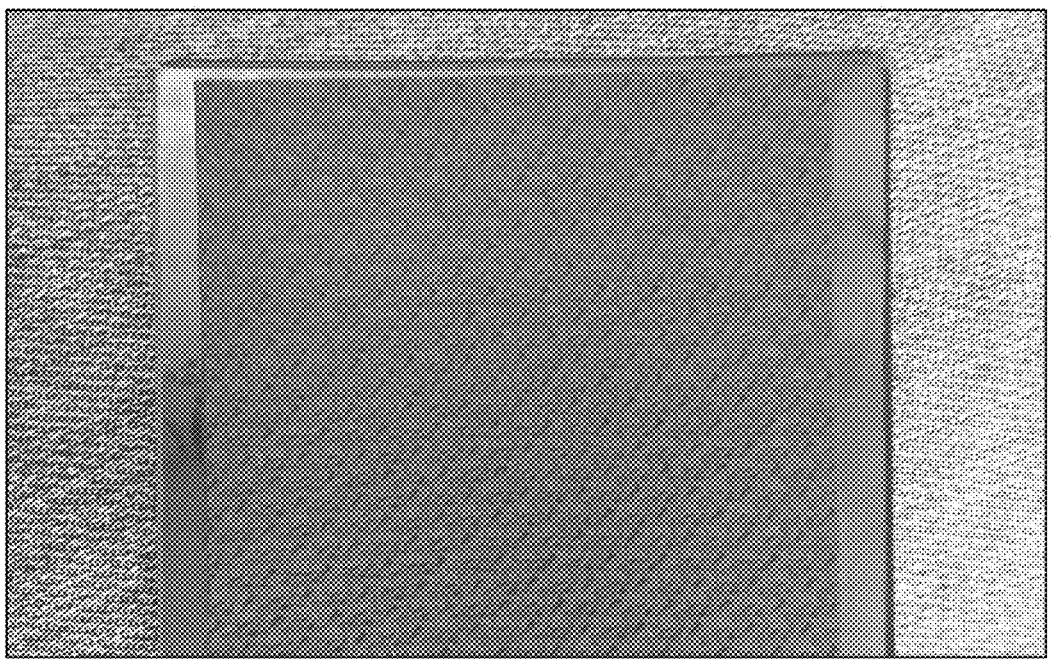
FIG. 10A illustrates a textile sample according to one or more embodiments described in this disclosure.

FIG. 10A depicts an illustrative texture sample. A texture sample, such as a textile, may be used to create a texture for a sheet of molded material. For example, a texture sample, such as a textile, may be scanned using a high-precision scanner. Using the high-precision scan, one or more lasers may etch a texture of the textile to a mold for use in a mold cavity of a molding machine. If a mold that is etched with a texture of the textile is used to mold a sheet of molded material, the texture of the textile may be a negative of a texture of the sheet of molded material. Thus, the final product (e.g., a sheet of molded material used for a shoe upper) may have a final texture that is similar to a texture of real textile.

Figure 10B:
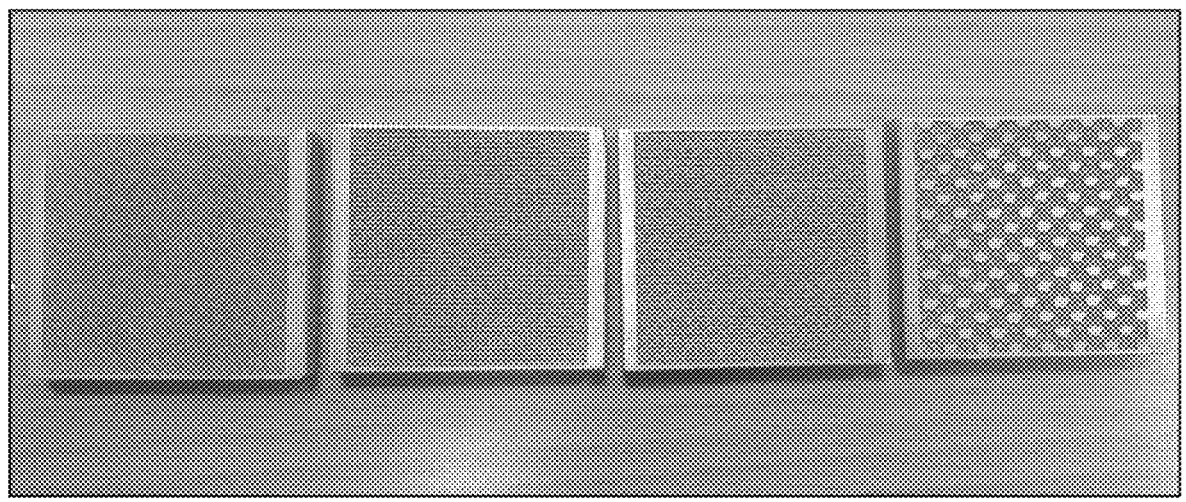
FIG. 10B illustrates a plurality of molds, each etched with a textile texture according to one or more embodiments described in this disclosure.

FIG. 10B depicts an illustrative plurality of molds, each etched with different textures. One or more molds may be used to mold a sheet of molded material. The one or more molds may be used to form one or more textures in a sheet of molded material.

Figure 11:
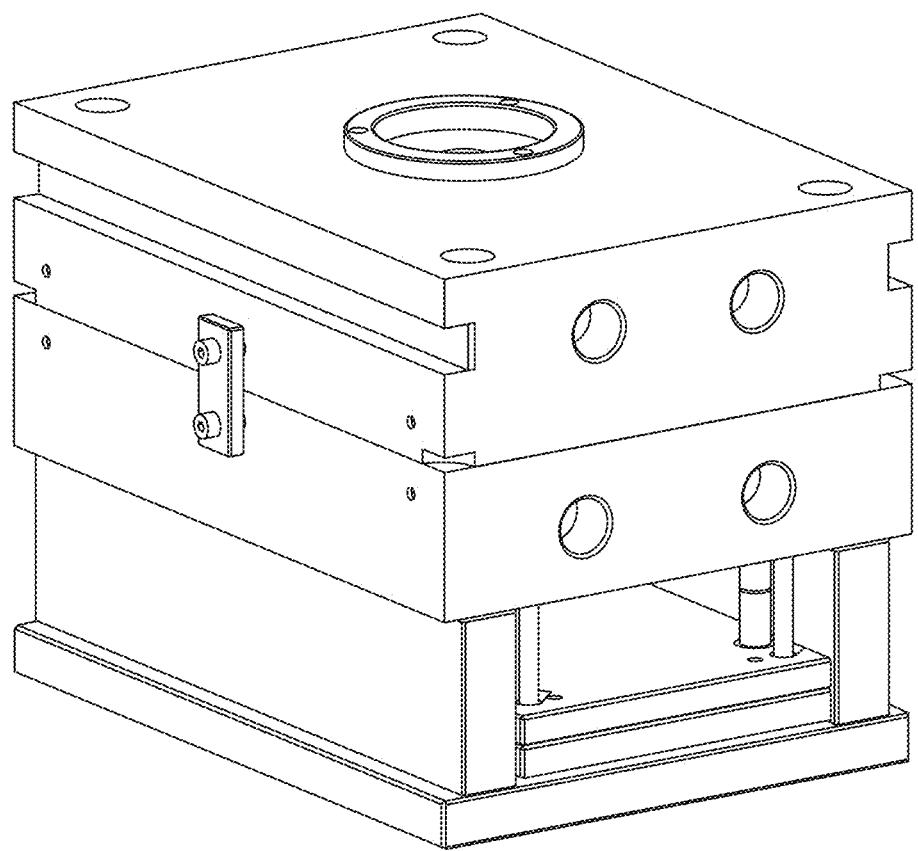
FIG. 11 illustrates a rendering of a portion of an injection mold machine according to one or more embodiments described in this disclosure.

FIG. 11 depicts an illustrative rendering of a molding machine. The molding machine may accept one or more molds (e.g., as depicted in FIG. 10B). The one or more molds may be used to form a sheet of molded material, which may be used to form a shoe upper of a shoe.

Figure 12A:
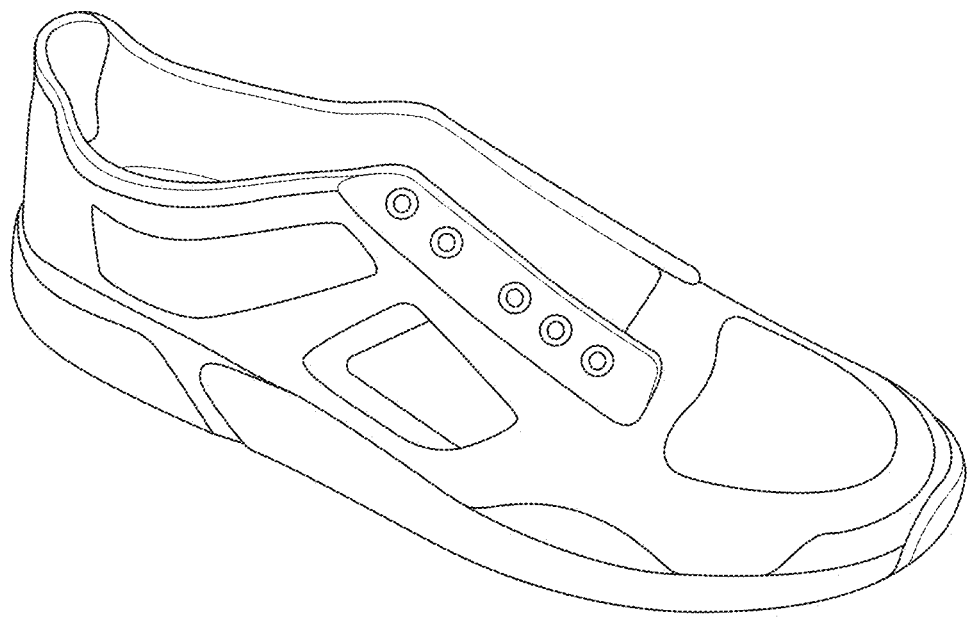
FIG. 12A illustrates a 3-D printed footwear according to one or more embodiments described in this disclosure.

FIG. 12A depicts an illustrative embodiment of a shoe with an upper made using a three-dimensional printer. As shown in FIG. 12A, a shoe may include an upper and a sole. The upper may be attached to the sole. The upper may be manufactured from a material similar to another material described elsewhere herein. The upper may have one or more textures or thicknesses. The upper may be printed in a relatively flat sheet, which may then be folded and curved as part of the shoe assembly process. For example, a first portion of the upper may be attached to a second portion of the upper (e.g., near the heel of the finished shoe). In another embodiment, the upper may be printed in a shape that the finished shoe will eventually take (e.g., in a manner such that the upper does not need to be folded or cemented before it is ready to attach to a sole of a shoe). The upper may be printed in one or more colors.

Figure 12B:
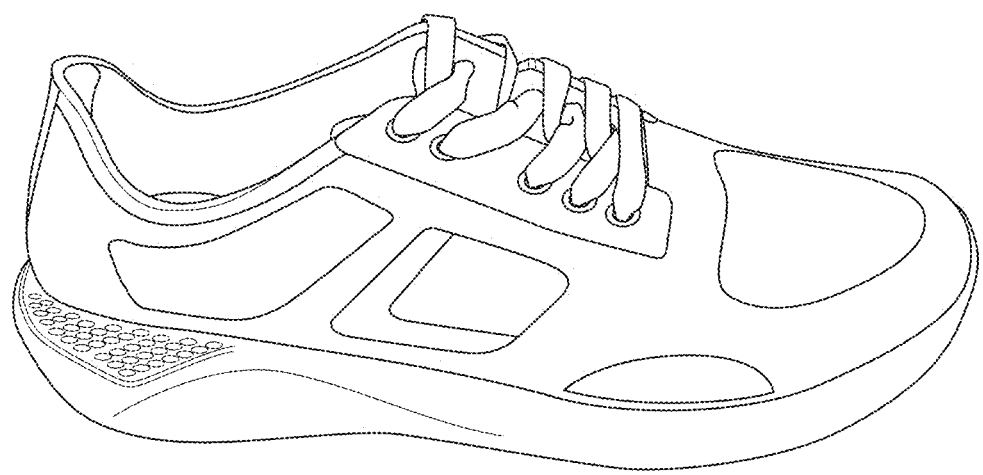
FIG. 12B illustrates a 3-D printed footwear according to one or more embodiments described in this disclosure.

FIG. 12B depicts an illustrative embodiment of a shoe with an upper made using a three-dimensional printer. The embodiment depicted in FIG. 12B includes an upper attached to a sole. The depicted upper also includes shoelaces, which may be added after the upper is printed. The upper may have one or more textures. The upper may be printed in one or more colors.

A 3-D printer may be used to assist in visualizing new shoe designs (e.g., a shoe manufactured using an injection-molded shoe upper). For example, by 3-D printing a shoe design, a shoe designer may confirm that a particular shoe upper design will have a correct shape after folding. This saves development cost over creating a mold for a prototype injection mold design, since a number of molds might have to be created before a final design may be determined.

Various modifications and additions can be made to the exemplary embodiments discussed without departing from the scope of the present invention. For example, while the embodiments described above refer to particular features or particular steps, the scope of this disclosure also includes embodiments having different combinations of features or steps, and embodiments that do not include all of the described features or steps. Accordingly, the scope of the present disclosure is intended to embrace all such alternatives, modifications, and variations as fall within the scope of the claims, together with all equivalents thereof.

What is claimed is:

1. A method comprising:
   injecting a material into a mold cavity to create a single sheet of molded material with a thickness less than 5 millimeters and molded holes extending between an inner surface of the molded material and an outer surface of the molded material, wherein the single sheet of molded material is in a shape that can be secured together to form a shoe upper; wherein the single sheet of molded material comprises a vamp, a medial portion, and a lateral portion, wherein the vamp includes at least some of the molded holes in the form of a number of small holes that increase breathability, and wherein the vamp adjacent to the number of small holes is closed;
   removing, from the mold cavity, the single sheet of molded material;
   folding the single sheet of molded material; and
   cementing a portion of the single sheet of molded material to a sole to form a shoe.

2. The method of claim 1, wherein the material is a thermoplastic polyurethane (TPU) material.

3. The method of claim 1, wherein the material is an ethylene vinyl acetate (EVA) material.

4. The method of claim 1, wherein the material has a melt-temperature range between 205 degrees Celsius and 225 degrees Celsius.

5. The method of claim 4, wherein the material has a short-term maximum temperature of 255 degrees Celsius.

6. The method of claim 1, comprising:
scanning a textile with a high-precision scanner; and
etching, using a laser, a texture of the textile to a mold for the mold cavity.

7. The method of claim 6, wherein the texture of the textile is a negative of a texture of the single sheet of molded material.

8. The method of claim 6, wherein the the thickness of single sheet of molded material is less than 5 millimeters and at least 0.04 millimeters.

9. The method of claim 1, wherein a first point of the single sheet of molded material has a first thickness, and a second point of the single sheet of molded material has a second thickness different from the first thickness.

10. The method of claim 1, wherein an average thickness of the single sheet of molded material is less than 1.5 millimeters.

11. The method of claim 1, wherein the single sheet of molded material comprises a plurality of different areas, each with a different texture.

12. The method of claim 1, comprising:
inserting an insole into the shoe.

13. The method of claim 12, wherein the insole is a foam insole.

14. The method of claim 12, wherein inserting the insole into the shoe comprises inserting the insole into the shoe such that after the insole is inserted into the shoe, at least a portion of the molded material is between at least a portion of the insole and at least a portion of the sole of the shoe.

15. The method of claim 12, wherein inserting the insole into the shoe comprises inserting the insole into the shoe such that after the insole is inserted into the shoe, at least a portion of the insole is in direct contact with at least a portion of the sole of the shoe.

16. The method of claim 1, wherein the single sheet of molded material is used to form an entire upper portion of the shoe.

17. The method of claim 1, wherein the shoe upper comprises a heel portion and a toe portion.

18. The method of claim 1, comprising:
attaching a tongue to the molded material by sewing the tongue to the molded material.

19. The method of claim 18, wherein the tongue is made at least partially of a knitted material.

20. The method of claim 1, comprising:
cementing a second portion of the single sheet of molded material to a third portion of the single sheet of molded material.

21. The method of claim 1, wherein the single sheet of molded material is a continuous textured single sheet of molded material.

* * * * *